US011887425B2

(12) United States Patent
Chen

(10) Patent No.: US 11,887,425 B2
(45) Date of Patent: Jan. 30, 2024

(54) ENTRY/EXIT DETECTION LOCKING DEVICE

(71) Applicant: Te-Yu Chen, Pingtung (TW)

(72) Inventor: Te-Yu Chen, Pingtung (TW)

( * ) Notice: Subject to any disclaimer, the term of this patent is extended or adjusted under 35 U.S.C. 154(b) by 357 days.

(21) Appl. No.: 17/238,222

(22) Filed: Apr. 23, 2021

(65) Prior Publication Data

US 2022/0343711 A1 Oct. 27, 2022

(51) Int. Cl.

| | |
|---|---|
| ***E05B 63/08*** | (2006.01) |
| ***G07C 9/29*** | (2020.01) |
| *E05B 63/18* | (2006.01) |
| *E05B 47/00* | (2006.01) |

(52) U.S. Cl.

CPC ............ *G07C 9/29* (2020.01); *E05B 47/0001* (2013.01); *E05B 63/08* (2013.01); *E05B 2047/0073* (2013.01)

(58) Field of Classification Search

CPC ......... Y10T 292/0982; Y10T 292/0894–0907; E05B 63/08; E05B 81/64; E05B 81/76; H01H 3/04; H01H 3/08; H01H 3/42; H01H 19/14; H01H 19/60; H01H 19/62; H01H 19/63; H01H 21/22; H01H 21/36; H01H 13/186

USPC ........ 70/278.7, 467; 200/17 R, 18, 568, 569, 200/329, 330, 332, 335–337

See application file for complete search history.

(56) References Cited

U.S. PATENT DOCUMENTS 2,379,305 A * 6/1945 Kaminky ............. H01H 13/186 200/5 R
3,767,881 A * 10/1973 Sharples .............. H01H 13/186 200/332
5,516,164 A * 5/1996 Kobayashi .............. E05B 81/20 292/201
5,678,870 A * 10/1997 Pelletier .................. E05B 55/12 292/169.16
8,919,828 B2 * 12/2014 Barth .................... E05B 85/243 292/201
9,262,875 B1 * 2/2016 Chen ................... E05B 47/0673
9,850,684 B2 * 12/2017 Dore Vasudevan .... E05B 63/16
10,364,592 B2 * 7/2019 Dore Vasudevan ......................... E05B 47/0673

FOREIGN PATENT DOCUMENTS

DE 1197157 B * 7/1965
DE 19632995 A1 * 2/1998 ............. E05B 81/64

* cited by examiner

*Primary Examiner* — Carlos Lugo
(74) *Attorney, Agent, or Firm* — Leong C. Lei

(57) ABSTRACT

An entry/exit detection locking device includes a knob axle of a lock and an engaging and holding unit and a retention unit. The knob axle includes upper and lower rotary axles each formed with a notch. The engaging and holding unit is arranged at one side of the knob axle. The retention unit is arranged below the knob axle. The retention unit is connected through a control circuit to a card reader at an outdoor side. Through adjustment, the engaging and holding unit is set in engagement with the notch of the upper rotary axle or the notch of the lower rotary axle to achieve a locked state for exit or entry. Rotating the knob axle for entry or exit triggers the retention unit to make a record of the exit or entry. The engaging and holding unit is connected to the card reader to enable unlocking through card swiping.

4 Claims, 5 Drawing Sheets

ENTRY/EXIT DETECTION LOCKING DEVICE

TECHNICAL FIELD OF THE INVENTION

The present invention relates to an entry/exit detection locking device, and more particularly to an entry/exit detection locking device that is operable to detect and record entry and exit of people and is settable for opening through card swiping so as to achieve intelligent doorway access control.

DESCRIPTION OF THE PRIOR ART

For a regular locking device that is locked after entry into an indoor space, a traditional way of operation is that locking from the inside is realized by operating an axle and locking and unlocking from the outside are realized with a key. However, in view of the advance of science and technology, card readers are widely used in hotels, public sites, or even households so that entry can be possible by swiping an access card, and this ensure doorway access control. This, as being an electronic locking device, is commonly used in business sites, such as offices and factories, and education facility, such as schools or dormitories, to provide doorway access control and also to record status of entry and exit of persons. Further, in additional to control of entry of persons, the doorway access control is also used to control exits of people. However, a traditional doorway access control does not involve a mechanism for controlling exit of people. In other words, a proper doorway access control measure must include control for both entry and exit of people, but known locking devices do not include such a measure.

SUMMARY OF THE INVENTION

The primary objective of the present invention is to provide an entry/exit detection locking device such that the locking device is operable to detect and record entry and exit of people and is settable for opening through card swiping so as to achieve intelligent doorway access control and enhance the utilization of the locking device.

The entry/exit detection locking device according to the present invention comprises a knob axle mounted to a lock and an engaging and holding unit and a detection unit. The knob axle comprises an inner rotary axle and an outer rotary axle. The inner and outer rotary axles are each formed with a notch. The engaging and holding unit is arranged at one side of the knob axle. The detection unit is arranged below the knob axle. The detection unit is connected, through a control circuit, to a card reader installed at an outdoor side. The engaging and holding unit is adjustable to selectively engage with the notch of the inner rotary axle or the outer rotary axle of the knob axle to achieve a locked state for exiting or entering. When a person attempts to exit or enter by rotating the knob axle, the detection unit is triggered to make a record of the exit or entry, and this, in combination with the engaging and holding unit being set in connection with the card reader to enable unlocking of the locking device through a card swiping operation, achieves the purpose of intelligent doorway access control.

The entry/exit detection locking device is such that the engaging and holding unit comprises an engaging bar. The engaging bar is mounted to a bracket, and the engaging bar is adjusted to selectively engage the notch of the inner rotary axle or the notch of the outer rotary axle of the knob axle. The bracket is connected to a solenoid valve. The solenoid valve is connected through a control circuit to card readers installed at an indoor side and an outdoor side. When the card readers detect a correct card swiping signal, the control circuit drives the solenoid valve to pull the engaging bar backward to disengage from the notch of the inner rotary axle or the notch of the outer rotary axle.

The entry/exit detection locking device is such that the detection unit comprises a base, a shaft, a first wing-shape spring plate, a second wing-shape spring plate, and a positioning member. The base is formed with two receiving troughs to respectively receive a first micro switch and a second micro switch therein and comprises a wall having a proper height and arranged at one side of the two receiving troughs. The wall is formed with a positioning hole. The shaft is formed with a fixing hole in a central portion. The first wing-shape spring plate and the second wing-shape spring plate are fit to and attached to the shaft so as to be set locations above the two receiving troughs, with the positioning member penetrating through the positioning hole of the base and fit into the fixing hole, to achieve positioning thereof.

DETAILED DESCRIPTION OF THE PREFERRED EMBODIMENT

Figure 1:
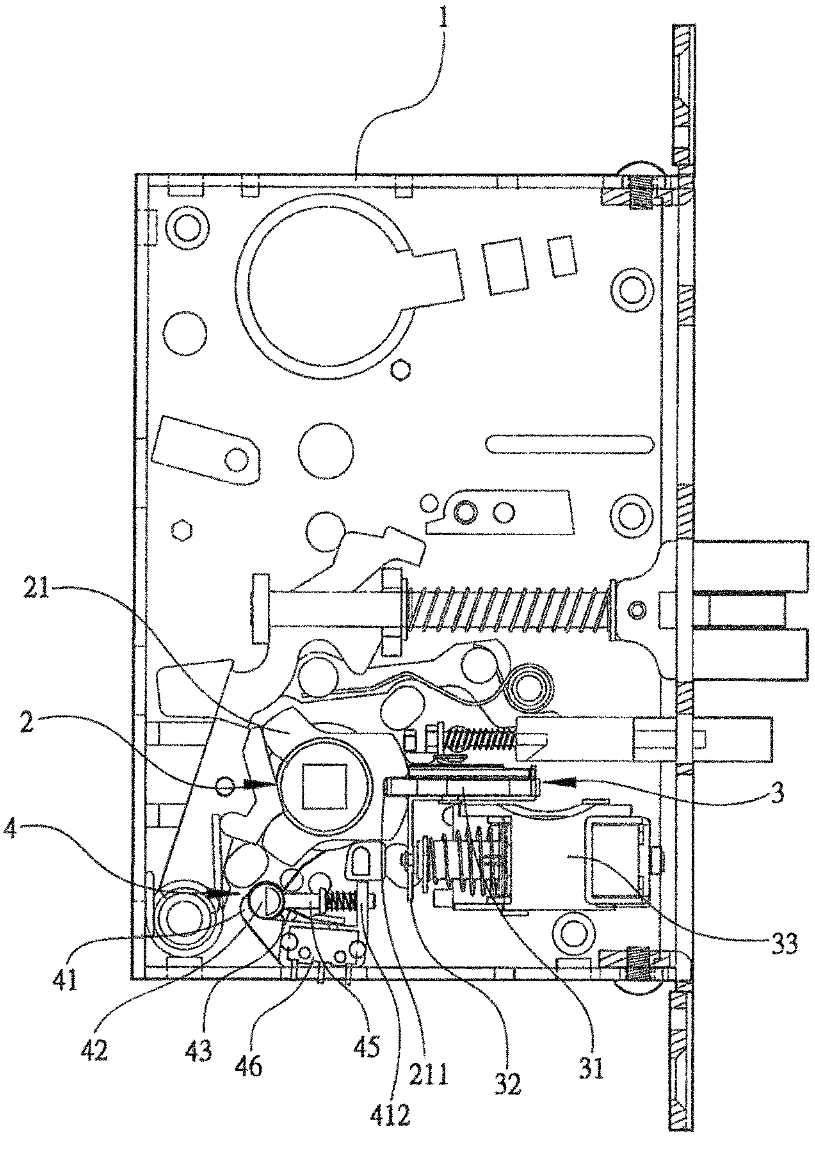
FIG. 1 is a view showing a device according to the present invention.
Figure 2:
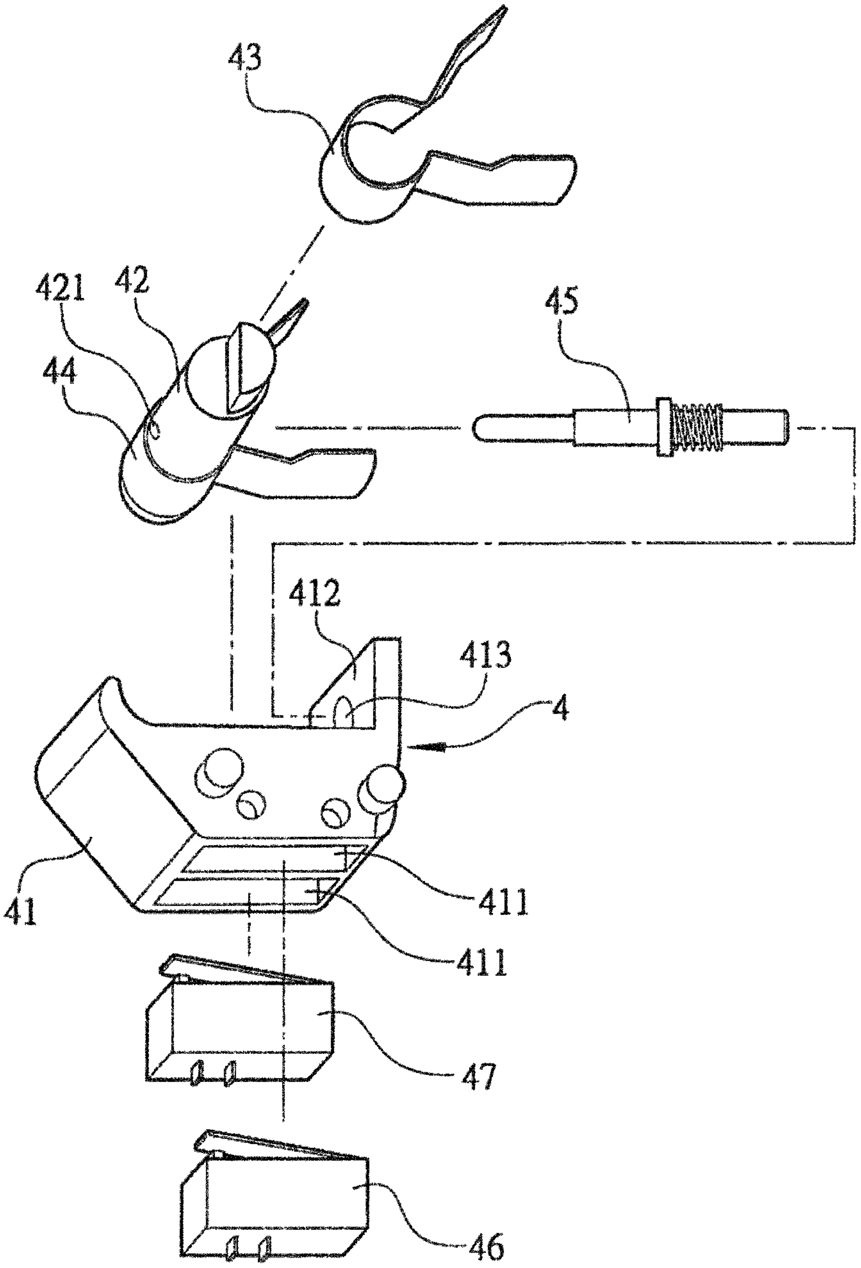
FIG. 2 is an exploded view showing a retention unit according to the present invention.
Figure 3:
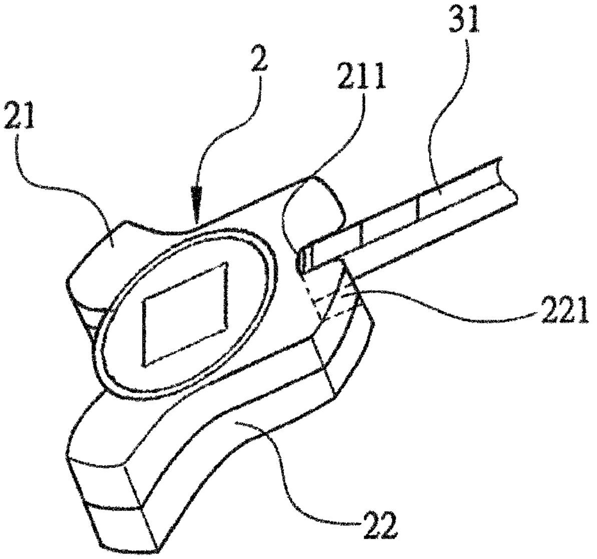
FIG. 3 is a perspective view showing an engaging and holding unit according to the present invention.

Referring to FIGS. 1, 2, and 3, which are respectively a view showing a device according to the present invention, an exploded view showing a detection unit according to the present invention, and a perspective view showing an engaging and holding unit according to the present invention, as shown in the drawings, the present invention comprises a knob axle 2 mounted to a lock 1 and also comprises an engaging and holding unit 3 and a detection unit 4. The knob axle 2 comprises an inner rotary axle 21 and an outer rotary axle 22 that are stacked on each other. The inner rotary axle 21 and the outer rotary axle 22 are each formed with a notch 211, 221.

The engaging and holding unit 3 is arranged at one side of the knob axle 2 and comprises an engaging bar 31. The engaging bar 31 is mounted to a bracket 32, such that the engaging bar 31 is made, through adjustment made thereto, to engage the notch 211 of the inner rotary axle 21 or the notch 221 of the outer rotary axle 22 of the knob axle 2. The bracket 32 is connected to a solenoid valve 33, and the solenoid valve 33 is connected, through a control circuit, to a card reader installed at an indoor site and an outdoor site, such that when the card reader detects a card swiping signal that is determined to be a correct signal, the control circuit drives the solenoid valve 33 to pull or otherwise move the engaging bar 31 backward to disengage from the notch 211 of the inner rotary axle 21 or the notch 221 of the outer rotary axle 22.

The detection unit 4 is arranged below the knob axle 2 and comprises a base 41, a shaft 42, a first wing-shape spring plate 43, a second wing-shape spring plate 44, and a positioning member 45. The base 41 is formed with two receiving troughs 411 to respectively receive a first micro switch 46 and a second micro switch 47 mounted therein, wherein the first micro switch 46 and the second micro switch 47 are in connection with a monitor and control center, and comprises a wall 412 that has a proper height and is arranged at one side of the two receiving troughs 411. The wall 412 is formed with a positioning hole 413. The shaft 42 is formed, in a central portion thereof, with a fixing hole 421. The first wing-shape spring plate 43 and the second wing-shape spring plate 44 are fit onto and mounted to the shaft 42 and are respectively disposed at locations above the two receiving troughs 411. The positioning member 45 penetrates through the positioning hole 413 of the base 41 and is fit into the fixing hole 421 to achieve positioning.

The detection unit 4 is arranged such that when the knob axle 2 is rotated (either from an indoor side or an outdoor side), the inner rotary axle 21 or the outer rotary axle 22 is caused to rotate and thus press down the first wing-shape spring plate 43 or the second wing-shape spring plate 44 to trigger the first micro switch 46 or the second micro switch 47, so that a signal is transmitted to the monitor and control center, and as such, the monitor and control center may make a record of a status of entry or exit of people according to the signal.

Through a combination of the above-described components, an entry/exit detection locking device is formed. To use, the engaging and holding unit 3 is properly adjusted to engage with the notch 211 of the inner rotary axle 21 or the notch 221 of the outer rotary axle 22 of the knob axle 2, in order to achieve a locking state for exit or entry. When a person attempts to exit or enter by rotating the knob axle 2, a trigger is made to the detection unit 4 to achieve recording of entry and exit, and this, in combination with the arrangement that the engaging and holding unit 3 is connected with the card reader to enable unlocking of the locking device through a card swiping operation, achieves the purpose of intelligent doorway access control.

Figure 4:
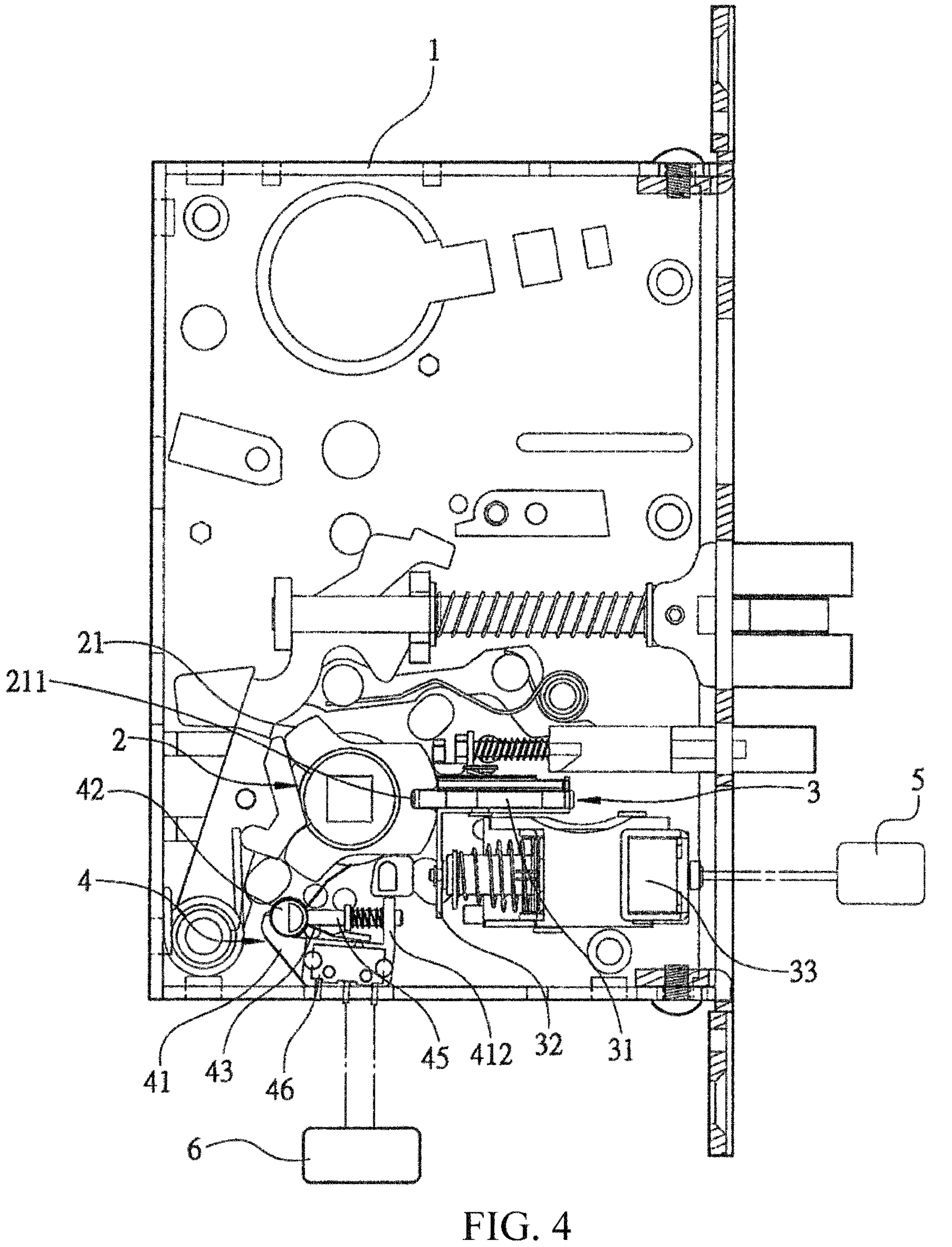
FIG. 4 is a schematic side view showing a state of use of the present invention.

Referring to FIG. 4, which is a schematic side view showing a state of use of the present invention, as shown in the drawings, when the present invention is put into use, the solenoid valve 33 of the engaging and holding unit 3 is connected to a card reader 5 installed at an indoor site or an outdoor site, and the first micro switch 46 and the second micro switch 47 of the detection unit 4 are respectively set in connection with the monitor and control center 6. When the card reader 5 detects a card swiping signal that is determined to be a correct signal, the control circuit drives the solenoid valve 33 to pull or otherwise move the engaging bar 31 backward to disengage from the notch 211 of the inner rotary axle 21 or the notch 221 of the outer rotary axle 22. Further, when a person attempts to exit or enter by rotating the knob axle 2, a signal is transmitted to the monitor and control center 6, and the monitor and control center 6 may record the state of a person entering and exiting, and this, in combination with the arrangement that the engaging and holding unit 3 is connected with the card reader 5 to enable unlocking of the locking device through a card swiping operation, achieves the purpose of intelligent doorway access control.

Figure 5:
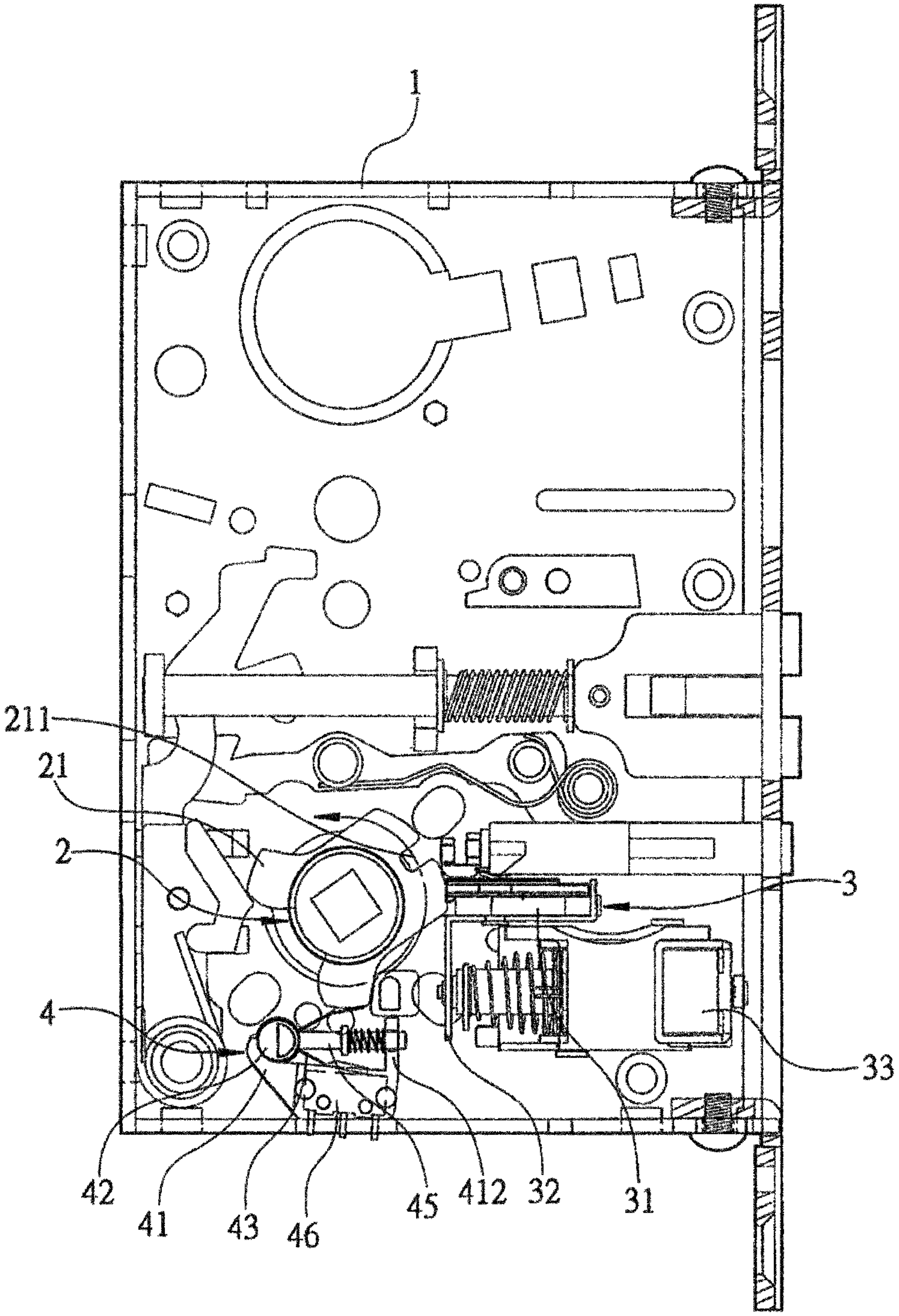
FIG. 5 is a schematic view showing a state of operation of the present invention.

Referring to FIG. 5, which is a schematic view showing a state of operation of the present invention, additional reference being had to FIGS. 2, 3, and 4, as shown in the drawings, in operation of the present invention, based on a need to control either entry or exit, the engaging bar 31 of the engaging and holding unit 3 is adjusted such that the engaging bar 31 engages either the notch 211 of the inner rotary axle 21 or the notch 221 of the outer rotary axle 22 of the knob axle 2 to achieve a locked and controlled state for entry or a locked and controlled state for exit. Taking control of entry as an example, the engaging bar 31 of the engaging and holding unit 3 is set in engagement with the notch 211 of the inner rotary axle 21 of the knob axle 2, so that the knob axle 2, when rotated from the outdoor side, does not unlock or release the locking device, and a person has to swipe a card on the card reader 5 located at the outdoor side, such that when the card reader 5 detects a correct card swiping signal, the control circuit drives the solenoid valve 33 to pull the engaging bar 31 backward to disengage from the notch 211 of the inner rotary axle 21 to allow the person at the outdoor side to rotate the knob axle 2 to unlock for entry. In addition, during the rotation, the knob axle 2 presses down the first wing-shape spring plate 43, causing the first wing-shape spring plate 43 to trigger the first micro switch 46, which transmits a signal to the monitor and control center 6, such that the monitor and control center 6 may make a record of the state that a person is entering according to the signal of the first micro switch 46.

Oppositely, in the case that the engaging bar 31 of the engaging and holding unit 3 is adjusted to be in engagement with the notch 221 of the outer rotary axle 22 of the knob axle 2, control is achieved for exit, and a person has to swipe a card on the card reader 5 located at an indoor site, such that when the card reader 5 detects a correct card swiping signal, the control circuit drives the solenoid valve 33 to pull the engaging bar 31 backward to disengage from the notch 221 of the outer rotary axle 22, and then the person at the indoor side may rotate the knob axle 2 to unlock for exiting, and thus, effective doorway access control can be realized. During the rotation, the knob axle 2 presses down the second wing-shape spring plate 44, causing the second wing-shape spring plate 44 to trigger the second micro switch 47, which transmits a signal to the monitor and control center 6, such that the monitor and control center 6 may make a record of the state that a person is exiting according to the signal of the first micro switch 47.

In summary, the present invention includes a knob axle that includes inner and outer rotary axles, in combination with an engaging and holding unit and a detection unit, to form an entry/exit detection locking device, such that the locking device is operable to detect and record entry and exit of people and is settable for opening through card swiping to thereby achieve intelligent doorway access control and enhance the utilization of the locking device.

I claim:

1. An entry/exit detection locking device, comprising:

a knob axle, which comprises an inner rotary axle and an outer rotary axle stacked on each other, the inner rotary axle and the outer rotary axle being each formed with a notch;

an engaging and holding unit, which is arranged at one side of the knob axle and is in connection with a card reader installed at an indoor site and an outdoor site, the engaging and holding unit comprising an engaging bar, the engaging bar being adjustable to selectively engage with the notch of the inner rotary axle of the knob axle or the notch of the outer rotary axle of the knob axle, wherein upon detecting a correct card swiping signal by the card reader, the engaging bar is driven to move backward to disengage from the notch or the inner rotary axle or the notch of the outer rotary axle; and a detection unit, which is arranged below the knob axle and comprises a base, a shaft, a first wing-shape spring plate, and a second wing-shape spring plate, wherein the base comprises a first micro switch and a second micro switch, the first wing-shape spring plate defines a first end configured to be contacted by the inner rotary axle, a second end configured to contact the first micro switch, and the first central connection portion, and the second wing-shape spring plate defines a first end configured to be contacted by the outer rotary axle, a second end configured to contact the second micro switch, and a second central connecting portion, wherein the first and second central connecting portions being fit to and attached to the shaft and located above the base, the first micro switch and the second micro switch being in connection with a monitor and control center;

wherein in an event that a person attempts to exit or enter by rotating the knob axle, the first micro switch or the second micro switch of the detection unit is triggered to initiate recording of the exit or entry and are operable in combination with the engaging and holding unit in connection with the card readers for enabling unlocking by means of card swiping to realize intelligent doorway access control.

2. The entry/exit detection locking device according to claim 1, wherein the engaging and holding unit is mounted to a bracket, and the bracket is connected to a solenoid valve, the solenoid valve being connected through a control circuit to the card readers at the indoor site and the outdoor site.

3. The entry/exit detection locking device as claimed in claim 1, wherein the base is formed with two receiving troughs, in which the first micro switch and the second micro switch are respectively disposed.

4. The entry/exit detection locking device as claimed in claim 1, wherein the base of the detection unit comprises a wall, the wall being formed with a positioning hole; and the shaft is formed, in a central portion thereof, with a fixing hole, wherein the first wing-shape spring plate and the second wing-shape spring plate are fit to and attached to the shaft and are located above the base, such that a positioning member penetrates through the positioning hole to fit into the fixing hole for positioning.

* * * * *